United States Patent [19]

Sonoh et al.

[11] Patent Number: 4,997,693
[45] Date of Patent: Mar. 5, 1991

[54] FIBER-REINFORCED RESIN MATERIAL AND FIBER-REINFORCED RESIN LAMINATE USING IT AS BASE MATERIAL

[75] Inventors: Takashi Sonoh, Chigasaki; Yasutaka Sakumoto, Yokohama; Sadao Kawashima, Kanagawa; Yoshisuke Hanasato, Chiba, all of Japan

[73] Assignee: Asahi Glass Company, Ltd., Tokyo, Japan

[21] Appl. No.: 272,414

[22] Filed: Nov. 17, 1988

[30] Foreign Application Priority Data

Nov. 20, 1987 [JP] Japan .............................. 62-191950
Dec. 11, 1987 [JP] Japan .............................. 62-312144

[51] Int. Cl.$^5$ .......................... B32B 3/10; B32B 3/16; B32B 3/22
[52] U.S. Cl. ........................ 428/46; 428/48; 428/221; 428/294; 428/339; 428/408
[58] Field of Search ................ 428/46, 48, 221, 294, 428/339, 408

[56] References Cited

U.S. PATENT DOCUMENTS

| 3,755,060 | 8/1973 | Bullock | 428/294 |
| 3,756,905 | 9/1973 | Mills et al. | 428/294 |
| 4,454,192 | 6/1984 | Suzuki et al. | 428/294 |
| 4,626,306 | 12/1986 | Chabrier | 156/180 |
| 4,640,861 | 2/1987 | Binnersley et al. | 428/294 |
| 4,680,224 | 7/1987 | O'Connor | 428/294 |
| 4,720,366 | 1/1988 | Binnersley et al. | 264/172 |

*Primary Examiner*—James C. Cannon
*Attorney, Agent, or Firm*—Oblon, Spivak, McClelland, Maier & Neustadt

[57] ABSTRACT

A fiber-reinforced resin material of tape shape having a thickness of at most 0.2 mm and a width/thickness ratio of from 25 to 200 and comprising a synthetic resin and continuous filaments contained as reinforcing material in the resin, said continuous filaments being aligned in lengthwise direction and said resin densely filling spaces among the filaments.

6 Claims, No Drawings

FIBER-REINFORCED RESIN MATERIAL AND FIBER-REINFORCED RESIN LAMINATE USING IT AS BASE MATERIAL

The present invention relates to a fiber-reinforced resin material of tape shape comprising a synthetic resin and continuous filaments contained as reinforcing material in the resin, wherein the synthetic resin is densely filled in spaces among the filaments, and to a fiber-reinforced resin laminate comprising a synthetic resin sheet and a plurality of such fiber-reinforced resin materials laminated as base material on the resin sheet.

Various types of fiber-reinforced resin materials have been known. Typical examples of such materials include FRP pellets or prepregs such as BMC and SMC, which are composed of thermosetting resins containing glass fibers and FRTP pellets, sheets and tapes which are composed of thermoplastic resins containing glass fibers.

The fibers contained in such materials may sometimes be in the form of woven fabrics. However, in many cases, they are used in the form of chopped strands obtained by cutting a roving of continuous filaments. Thus, the fibers are not continuous, and they are likely to be non-uniform. Accordingly, shaped products prepared from such materials have a problem that no adequate strength can be expected.

Shaped products prepared from FRTP made of a thermoplastic resin have difficulties such that the shaped products are inferior in the transparency or poor in strength, since the adhesion or impregnation of the resin to the fibers is inadequate even if the resin itself has transparency as in the case of a vinyl chloride resin.

On the other hand, a fiber-reinforced resin material in the form of a thin sheet or tape having a thickness of from 0.3 to 1 mm prepared by impregnating a roving of continuous filaments with an emulsion containing a synthetic resin polymer, followed by drying and press-molding under heating to have the filaments aligned in a predetermined direction, has been practically in use. For the preparation of such a material, Japanese Examined Patent Publication No. 13218/1972 discloses a method wherein e.g. a roving of glass filaments is dipped in an emulsion containing a vinyl chloride resin polymer, then dried and heat-pressed to form a sheet. Further, Japanese Unexamined Patent Publication No. 40113/1986 discloses a resin-containing strip obtained by a melt-extrusion method wherein a thermoplastic resin is introduced in a molten state from an extruder head into a continuous fiber strand under tension, and a process for its preparation.

The above-mentioned fiber-reinforced resin material in the form of a sheet or tape wherein filaments are aligned in a predetermined direction is such that the resin is merely adhered to the surface of the roving filaments, whereby the resin is likely to be easily peeled off to leave portions where no resin is attached. Accordingly, it has been difficult to obtain a shaped product having a uniform resin layer from such a material. Further, as a method for preparing a fiber-reinforced resin material in the form of a thin sheet or tape as a shaped material, it has been known to employ a method wherein e.g. a resin-impregnated roving of filaments is pressed and spread under pressure between press rolls. However, such a method tends to bring about breakage or fuzzing of filaments. Consequently, the strength of the shaped product tends to be low. Accordingly, the thickness of the fiber-reinforced resin material wherein continuous filaments are aligned in a predetermined direction is limited, and it is impossible to obtain a thin material of a level of not thicker than 0.2 mm and having a high resin content.

Also in the case of the resin-containing strip product obtained by the melt extrusion method, the filling of the resin into spaces among filaments is not necessarily adequate due to e.g. the polarity of the surface of filaments or due to the flow resistance in the filament strand caused by high viscosity of the molten resin during the preparation, whereby the molten resin tends to be localized at the surface portion of the strip. Therefore, it is difficult to obtain a thin product wherein the resin is adequately filled.

Under these circumstances, the present inventors have proposed a method for producing a fiber-reinforced resin material of tape shape having an extremely thin thickness with a high resin content, wherein continuous filaments are aligned in a predetermined direction (Japanese Patent Application No. 156447/1987).

The present inventors have studied the shape and dimensions suitable as the material of tape shape produced by such a method. As a result, they have found the thickness and the width/thickness ratio suitable to obtain a transparent highly strong laminate comprising a synthetic resin sheet and such fiber-reinforced resin materials of tape shape disposed as base material thereon. The present invention has been accomplished on the basis of these discoveries. Accordingly, it is an object of the present invention to provide a fiber-reinforced resin material in the form of a thin tape wherein continuous fibers are aligned in lengthwise direction and the synthetic resin is densely filled in spaces among filaments, as fiber-reinforced resin material free from the conventional problems.

Another object of the present invention is to provide a fiber-reinforced resin laminate having excellent transparency and mechanical properties, which comprises a synthetic resin sheet and a base material laminated thereon, the base material comprising a plurality of the above-mentioned fiber-reinforced resin materials of tape shape.

The present invention provides a fiber-reinforced resin material of tape shape having a thickness of at most 0.2 mm and a width/thickness ratio of from 25 to 200 and comprising a synthetic resin and continuous filaments contained as reinforcing material in the resin, said continuous filaments being aligned in lengthwise direction and said resin densely filling spaces among the filaments.

The present invention also provides a transparent fiber-reinforced resin laminate having at least one laminate layer comprising a synthetic resin sheet and a base material laminated thereon, the base material comprising a plurality of the above fiber-reinforced resin materials of tape shape.

Now, the present invention will be described in detail with reference to the preferred embodiments.

In the present invention, the continuous filaments contained as reinforcing material in the resin are prepared from a roving or strand which is prepared by gathering filaments e.g. inorganic filaments such as glass filaments, carbon filaments, ceramic filaments or metal filaments, or organic filaments such as polyamide filaments, polyimide filaments or polyamideimide filaments, by means of a gathering agent. Here, the continuous filaments are preferably glass filaments obtained from a glass fiber roving, since the fiber-reinforced resin material of tape shape (hereinafter referred to simply as a shaped material) or a shaped product made from such a shaped material has transparency.

The roving is a bundle of a plurality of filaments having fine diameters treated by a sizing agent. For example, a usual product of a glass fiber roving having a bulk of about 2 mm is a bundle of about 3,000 filaments each having a diameter of about 12 μm. If the diameter of the roving is too large, it is impossible to obtain the thickness and the width/thickness ratio of the present invention by unbinding and spreading the roving of continuous filaments in the process for the production of the shaped material, and it is difficult to adequately fill the resin into the filaments, whereby the distribution of the resin tends to be non-uniform.

In the shaped material of the present invention, the synthetic resin is preferably a thermoplastic resin. In the process of the present invention, the resin is impregnated and densely filled into the roving of continuous filaments in the form of an emulsion, it is preferably a resin which can readily form an emulsion and which is transparent. It includes, for example, homopolymers of e.g. vinyl chloride, vinylidene chloride, vinyl acetate, an acrylate, a methacrylate, styrene, acrylonitrile, ethylene, propylene and a fluorine-containing monomer, and copolymers obtained by copolymerizing such monomer with other copolymerizable monomers. Among them, a homopolymer of vinyl chloride or a copolymer of vinyl chloride with a comonomer such as vinyl acetate, vinylidene chloride, an acrylate, a methacrylate, acrylonitrile, maleic anhydride or a maleate in an amount not to deteriorate the properties of vinyl chloride, may be used, which is known to be hardly impregnated to fibers. Further, the synthetic resin may, of course, be a thermoplastic resin which is opaque or colored. The larger the amount of the resin filled in the shaped material, the better. The amount of the resin in the shaped material is preferably at least 30% as so-called ignition loss (Ig loss).

The shaped material of the present invention can be prepared by a process for producing a fiber-reinforced resin tape invented by the present inventors. In order to bring the thickness and the width/thickness ratio of the shaped material within the ranges of the present invention, the tensile stress imparted to the roving during the unbinding and spreading after impregnation of the roving with the resin emulsion is adjusted to obtain a shaped material having a desired thickenss and a desired width/thickness ratio. Thus, it is common that each roving is formed into a fiber-reinforced resin tape by the above process. However, by disposing a plurality of them in a side-by-side relationship, it is possible to obtain a wide tape. Here, the unbinding and spreading is an operation of passing the roving on a member having a curved surface for skidding or slipping the roving to disperse and unify the concentrated stress of the roving so that the roving strand of filaments is unbound and spread. During this operation, the fine resin particles in the emulsion enter into spaces among the filaments and serve as wedges so that the resin is densely filled, and the unbinding and spreading are thereby facilitated.

For example, in a case where a roving composed of 3,000 of 12 μm in diameter and having a bulk of about 2 mm is unbound and spread by properly adjusting the tensile stress exerted to the roving, it is possible to obtain a tape-shaped material having a thickness of about 0.1 mm, a width of about 10 mm and a width/thickness ratio of 100.

The shaped material of the present invention has a thickness of at most 0.2 mm and a width/thickness ratio of from 25 to 200. If the width/thickness ratio is less than 25, the resin content tends to be too small and the distribution of the resin tends to be non-uniform, and a shaped product made thereof tends to be poor in the transparency and the strength tends to be low. On the other hand, it is practically difficult to have the width/thickness ratio exceeding 200. For example, the above-mentioned shaped product of the present invention having a thickness of about 0.1 mm, a width/thickness ratio of 100 and a width of 10 mm, comprises in its cross-section, about 5 filaments in the thickness direction and about 600 filaments in the width direction, which are substantially uniformly disposed, with the resin densely filled among the filaments. Yet, it has transparency, and the strength of the shaped product made thereof is sufficiently high. On the other hand, even when the same roving is employed, if the shaped material has a thickness of 0.4 mm, a width/thickness ratio of 20 and a width of 8 mm, the filaments tend to be localized in the thickness direction, and the resin tends to be inadequately filled among the filaments, and the distribution of the resin will be non-uniform. Besides, the product will be inferior also in the transparency. If the thickness is so thin that it is less than 0.1 mm, the shaped product tends to be a film-like, which is difficult to handle and unsuitable as a shaped product.

A plurality of such shaped products are flatly arranged and laminated as base material on a synthetic resin sheet to obtain a fiber-reinforced resin laminate having at least one laminate layer comprising a synthetic resin sheet and the base material.

As the base material, a plurality of shaped materials may be used, for instance, in a woven form. However, as will be described hereinafter with respect to the lamination method to obtain a laminate, the base material may not only be formed to have a specific form, but also be formed by arranging a plurality of shaped materials on a synthetic resin sheet in parallel to one another in the lengthwise direction with a desired distance, for instance, by a multi-step pressing method. Further, in such an arrangement of the shaped materials, a plurality of the shaped materials may, of course be arranged densely in parallel to each other in the lengthwise direction, or densely or with a predetermined distance in both the lengthwise and transverse directions.

On the other hand, the synthetic resin sheet to be laminated on the surface of the base material composed of the shaped materials is preferably a transparent sheet. The color and the type of the material are not critical.

From the viewpoint of the lamination properties and adhesiveness, it is preferred to employ a resin sheet made of the same thermoplastic resin as used for the impregnation of the shaped materials. Namely, if the resin of the shaped materials is a vinyl chloride resin, the resin sheet is preferably a vinyl chloride resin sheet. The thickness of such a synthetic resin sheet may be at any level ranging from an extremely thin film to a sheet or slightly thin plate. Further, the resin sheet may not necessarily be flat, and the shape may suitably be selected depending upon the particular purpose of the fiber-reinforced resin laminate such as a corrugated sheet. Further, the laminate may not necessarily be composed of a one layer comprising the base material and the synthetic resin sheet. For example base materials may be laminated in a sandwich form, or synthetic resin sheets may be laminated in multi-layers.

There is no particular restriction as to the lamination method to obtain such a laminate. A multi-step pressing method as a lamination method commonly employed for the preparation of synthetic resin sheets, a belt pressing method as a continuous system, or a lamination method by direct press-bonding such as an extrusion method or a calender method, may be employed. The lamination by such lamination methods is conducted under the respective optimum conditions for lamination. For example, in the case of the multi-step pressing method, a thermoplastic resin sheet having a predetermined shape and transparency is set in the press, then a plurality of shaped materials are disposed as base material on the resin sheet in parallel to one another, for example with a certain distance in the lengthwise direction, the same resin sheet as above is then placed thereon, followed by pressing under a predetermined pressure under heating. In the case of the belt pressing method as a continuous system, a thermoplastic resin sheet and shaped materials are continuously supplied and pressed under a predetermined pressure under heating between upper and lower belts.

In such a lamination method, the thermoplastic resin sheet may be subjected to surface treatment, or a flat plate may be subjected to corrugation treatment. Further, thermoplastic resin sheets and base materials each comprising a plurality of shaped materials, may alternately be laminated to form a multi-layered laminate. Further, the arrangement of shaped materials may optionally be varied, or a properly colored thermoplastic resin sheet may be used to improve the appearance of the laminate, or a thermoplastic resin sheet having improved weather resistance may be employed to obtain a fiber-reinforced resin laminate with improved weather resistance.

The fiber-reinforced resin laminate of the present invention thus obtained, can readily be cut into a desired shape. For example, it may be processed into an optional shape by means of an electric tool.

Now, the present invention will be described in further detail with reference to Examples. However, it should be understood that the present invention is by no means restricted to such specific Examples.

EXAMPLES 1 to 9

A glass fiber roving composed of about 3,000 glass filaments each having a bulk of about 12 μm was impregnated with an emulsion of a polyvinyl chloride resin and subjected to unbinding and spreading by controlling the tensile stress of the roving during the unbinding and spreading so as to obtain a shaped material having the thickness and the width as identified in Table 1. Then, heat treatment was applied to obtain a tape-shaped material having the thickness and the width as shown in Table 1 comprising the polyvinyl chloride resin and the glass filaments contained as reinforcing material therein.

The dimensions (thickness, width, width/thickness ratio) of the shaped material thus obtained were measured. The cross-section was examined by a test glass for the number of filaments. The ignition loss (Ig loss) was measured, and the transparency was examined. The tensile strength in the lengthwise direction was measured. The results are shown in Table 1.

COMPARATIVE EXAMPLES 1 and 2

Tape-shaped materials having the thickness and the width as identified in Table 1 and containing glass filaments as reinforcing material in a polyvinyl chloride resin, were prepared in the same manner as in the foregoing Examples except that the tensile stress of the roving during the unbinding and spreading was adjusted to obtain the shaped materials having the thickness and the width as identified in Table 1.

The dimensions and the properties of the shaped products were examined and measured in the same manner as in the preceding Examples. The results are shown in Table 1.

TABLE 1

| | Shape | | | Number of filaments as determined by cross-sectional observation | | | | Tensile |
| | Thickness (mm) | Width (mm) | Width/ Thickness | Thickness direction | Width direction | Ig loss (%) | Transparency | strength (kg/mm) |
| --- | --- | --- | --- | --- | --- | --- | --- | --- |
| Example 1 | 0.1 | 10 | 100 | about 5 | about 600 | 41 | Transparent | 49–55 |
| Example 2 | 0.2 | 7 | 35 | 10 | 300 | 45 | " | 51–58 |
| Example 3* | 0.2 | 35 | 175 | 10 | 1200 | 46 | " | 42–53 |
| Example 4 | 0.15 | 7 | 47 | 8 | 380 | 42 | " | 48–55 |
| Example 5 | 0.15 | 10 | 67 | 8 | 400 | 46 | " | 44–57 |
| Example 6 | 0.15 | 12 | 80 | 7 | 430 | 50 | " | 50–60 |
| Example 7** | 0.15 | 18 | 120 | 7 | 860 | 44 | " | 47–58 |
| Example 8 | 0.1 | 12 | 120 | 4 | 800 | 42 | " | 53–61 |
| Example 9 | 0.1 | 15 | 150 | 3 | 1000 | 47 | " | 47–55 |
| Comparative Example 1 | 0.5 | 2 | 4 | 25 | 120 | 29 | Opaque | 29–33 |
| Comparative Example 2 | 0.08 | 17 | 213 | 2 | 1500 | 45 | Transparent | 15–19 |

*A wide tape was prepared from four rovings disposed in a side-by-side relationship.
**A wide tape was prepared from two rovings disposed in a side-by-side relationship.

EXAMPLES 10 to 12

Tape-shaped materials having the thickness and the width as identified in Table 2 were prepared in the same manner as in Examples 2, 6 and 9 except that instead of the polyvinyl chloride resin emulsion used in Examples 2, 6 and 9, an emulsion prepared by emulsifying a vinyl chloride-acrylate copolymer (vinyl chloride/acrylate=95/5) with an emulsifier, was used.

The dimensions and the properties of these shaped materials were examined and measured in the same manner as in the preceding Examples. The results are shown in Table 2.

EXAMPLES 13 to 15

Tape-shaped materials having the thickness and the width as identified in Table 2 were prepared in the same manner as in Examples 2, 6 and 9 except that instead of the polyvinyl chloride resin emulsion used in Examples 2, 6 and 9, an emulsion prepared by adjusting with an emulsifier a latex containing a polymer (solid content: 48%) obtained by emulsion polymerization of methyl methacrylate, was used.

The dimensions and the properties of these shaped materials were examined and measured in the same manner as in the foregoing Examples. The results are shown in Table 2.

EXAMPLES 16 to 23

By using the tape-shaped materials obtained in Examples 1, 5, 6 and 8 and polyvinyl chloride resin sheets of from 0.1 to 0.5 mm in thickness as the synthetic resin sheets, fiber-reinforced resin laminates of 1 m × 1 m were prepared by the combinations and arrangements as identified in Table 3 under the following pressing conditions (multi-daylight press).

Pressing temperature: 180° C.
Pressing pressure: 90 kg/cm$^2$
Pressing time: Heating for 50 minutes and cooling for 50 minutes.

The properties of the fiber-reinforced resin laminates thus prepared were measured. The results are shown in Table 3.

TABLE 2

| | Shape | | | Number of filaments as determined by cross-sectional observation | | | | Tensile strength (kg/mm) |
|---|---|---|---|---|---|---|---|---|
| | Thickness (mm) | Width (mm) | Width/ Thickness | Thickness direction | Width direction | Ig loss (%) | Transparency | |
| Example 10 | 0.2 | 7 | 35 | about 10 | about 300 | 47 | Transparent | 30–37 |
| Example 11 | 0.15 | 9 | 60 | 8 | 400 | 50 | " | 28–35 |
| Example 12 | 0.1 | 15 | 150 | 3 | 1000 | 51 | " | 26–29 |
| Example 13 | 0.2 | 7 | 35 | 10 | 300 | 44 | " | 27–34 |
| Example 14 | 0.15 | 9 | 60 | 8 | 400 | 46 | " | 25–29 |
| Example 15 | 0.1 | 15 | 150 | 3 | 1000 | 53 | " | 24–28 |

TABLE 3

| | Shaped material | | | Polyvinyl chloride resin sheet | | |
|---|---|---|---|---|---|---|
| | Width (mm) | Thickness (mm) | Disposition as base material | Sheet | Thickness | Disposition to base material |
| Example 16 | 10 | 0.1 | Distance of 10 mm in lengthwise direction | Transparent flat sheet | 0.5 | Both sides |
| Example 17 | 10 | 0.15 | Distance of 10 mm in lengthwise direction | Transparent flat sheet | 0.5 | " |
| Example 18 | 10 | 0.15 | Cross | Transparent flat sheet | 0.43 | " |
| Example 19 | 10 | 0.15 | Distance of 10 mm spaced cross | Transparent flat sheet | 0.43 | " |
| Example 20 | 15 | 0.15 | Distance of 10 mm in lengthwise direction | Transparent flat sheet | 0.1 | One side |
| Example 21 | 15 | 0.15 | Cross five layers | Transparent flat sheet | 0.5 | " |
| Example 22 | 4 | 0.1 | Cross five layers | Transparent flat sheet | 0.2 | " |
| Example 23 | 4 | 0.1 | Cross | Transparent flat sheet | 0.2 | " |
| Example 24 | 10 | 0.15 | Distance of 10 mm spaced cross | Transparent corrugated sheet (32 mm pitch) | 0.43 | Both sides |
| Comparative Example 1 | Corrugated sheet of glass fiber net-reinforced hard polyvinyl chloride resin having a thickness of 32 mm | | | | | |
| Comparative Example 2 | Flat sheet of glass fiber-reinforced polyvinyl chloride resin having a thickness of 10 mm, "FRV" manufactured by Asahi Glass Company Ltd. | | | | | |

| | Properties | | | |
|---|---|---|---|---|
| | Tensile strength (kg/mm$^2$) | Flexural strength (kg/mm$^2$) | Falling ball test* | Light transmittance 550 Nm (%) |
| Example 16 | 16 | 20 | Slightly whitened | 72 |
| Example 17 | 18 | 22 | " | 72 |
| Example 18 | 12 | 16 | " | 70 |
| Example 19 | 9 | 12 | " | 70 |
| Example 20 | 4 | 15 | " | 75 |
| Example 21 | 23 | 24 | " | 60 |
| Example 22 | 17 | 20 | " | 71 |
| Example 23 | 23 | 26 | " | 70 |
| Example 24 | 9 | 12 | " | 69 |
| Comparative Example 1 | 5 | 6 | Broke | 54 |
| Comparative | 8 | 14 | Radially cracked | 0 |

EXAMPLES 25 to 26

The tape-shaped materials obtained in Examples 10 and 13 were used. Twelve materials of each were disposed in parallel to one another with a distance of 10 mm in the lengthwise direction. A polymethyl methacrylate sheet having a size of 1 m × 1 m and a thickness of 2 mm was placed thereon and heat-pressed under a pressure of 20 kg/mm² to obtain a glass fiber-containing transparent laminate having a thickness of about 2 mm. The physical properties of the laminate thus obtained were measured. The results are shown in Table 4.

TABLE 4

| | Shaped material | | | Polymethyl methyacrylate sheet | | Properties | |
|---|---|---|---|---|---|---|---|
| | Width (mm) | Thickness (mm) | Disposition as base material | Sheet | Disposition to base material | Tensile strength (kg/mm²) | Flexural strength (kg/mm²) |
| Example 25 | 10 | 0.2 | Distance of 10 mm in lengthwise direction | Transparent flat sheet | One side | 9 | 8 |
| Example 26 | 10 | 0.2 | Distance of 10 mm in lengthwise direction | Transparent flat sheet | One side | 10 | 9 |

The fiber-reinforced resin material of tape shape of the present invention has features that it is per se transparent, and it has extremely high tensile strength in lengthwise direction since the reinforcing filaments are aligned in legnthwise direction. By using such shaped materials as base material, a fiber-reinforced resin laminate is obtained by the lamination with a synthetic resin sheet. Such a fiber-reinforced resin laminate can be made transparent by using a transparent synthetic resin sheet for the lamination. Further, it has a merit that it has excellent mechanical strength.

Furthermore, by properly selecting the arrangement of the shaped materials as base material or the type of the synthetic resin sheet, it is possible to obtain a laminate having excellent appearance and decorative properties.

We claim:

1. A transparent fiber-reinforced resin material of tape shape having a thickness of at most 0.2 mm and a width/thickness ratio of from 25 to 200, comprising a thermoplastic resin and continuous filaments contained as reinforcing material in the resin, said continuous filaments being aligned in lengthwise direction, and said resin densely filling spaces among the filaments, said tape-shaped transparent fiber-reinforced resin material being capable being formed under conditions of heat and pressure into transparent shaped products having good strength.

2. The resin material according to claim 1, which is obtained by impregnating a strand of continuous filaments with a synthetic resin emulsion, and unbinding and spreading the strand of continuous filaments while applying a tension thereto, followed by drying and heating.

3. The resin material according to claim 1, which has a thickness of from 0.1 to 0.2 mm.

4. The resin material according to claim 1, wherein said continuous filaments are glass filaments obtained by unbinding and spreading a glass fiber roving.

5. A transparent fiber-reinforced resin laminate having at least one laminate layer comprising a transparent thermoplastic resin sheet and a base material laminated thereon, said base material comprising a plurality of fiber-reinforced resin materials of tape shape disposed flatly on said transparent thermoplastic resin sheet, each fiber-reinforced resin material of tape shape having a thickness of at most 0.2 mm and a width/thickness ratio of from 25 to 200, said fiber-reinforced resin material comprising a transparent thermoplastic resin and continuous filaments contained as reinforcing material in the resin, said continuous filaments being aligned in lengthwise direction, and said resin densely filling spaces among the filaments.

6. The laminate according to claim 5, wherein said continuous filaments are glass filaments.

* * * * *